(12) United States Patent
Ryu et al.

(10) Patent No.: US 10,854,936 B2
(45) Date of Patent: Dec. 1, 2020

(54) BATTERY MODULE, BATTERY PACK INCLUDING BATTERY MODULE, AND VEHICLE INCLUDING BATTERY PACK

(71) Applicant: LG CHEM, LTD., Seoul (KR)

(72) Inventors: Jae-Uk Ryu, Daejeon (KR); Ji-Su Yoon, Daejeon (KR); Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/307,789

(22) PCT Filed: Feb. 19, 2018

(86) PCT No.: PCT/KR2018/002007
§ 371 (c)(1),
(2) Date: Dec. 6, 2018

(87) PCT Pub. No.: WO2018/174414
PCT Pub. Date: Sep. 27, 2018

(65) Prior Publication Data
US 2019/0267684 A1    Aug. 29, 2019

(30) Foreign Application Priority Data

Mar. 21, 2017  (KR) .................. 10-2017-0035398

(51) Int. Cl.
*H01M 10/625* (2014.01)
*H01M 10/613* (2014.01)
(Continued)

(52) U.S. Cl.
CPC ....... *H01M 10/625* (2015.04); *H01M 2/1077* (2013.01); *H01M 2/206* (2013.01);
(Continued)

(58) Field of Classification Search
CPC ............ H01M 2/0217; H01M 2/0237; H01M 2/0262; H01M 10/625; H01M 10/613;
(Continued)

(56) References Cited

U.S. PATENT DOCUMENTS

2006/0073377 A1    4/2006  Al-Hallaj et al.
2007/0141457 A1*   6/2007  Amagai ............ H01M 2/0212
                                                    429/152

(Continued)

FOREIGN PATENT DOCUMENTS

EP    2950379     * 12/2015
EP    2950379 A1   12/2015

(Continued)

OTHER PUBLICATIONS

International Search Report (PCT/ISA/210) issued in PCT/KR2018/002007, dated Jun. 7, 2018.

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

A battery module includes a plurality of battery cells stacked on one another, a cell housing configured to accommodate the plurality of battery cells, a top plate configured to cover an entire upper side of the cell housing and electrically connected to any one of positive electrodes and negative electrodes of the plurality of battery cells, and a bottom plate disposed to face the top plate and configured to cover an entire lower side of the cell housing and electrically connected to the other of the positive electrodes and the negative electrodes of the plurality of battery cells.

11 Claims, 5 Drawing Sheets

(51) Int. Cl.
   *H01M 10/643* (2014.01)
   *H01M 10/6551* (2014.01)
   *H01M 10/6554* (2014.01)
   *H01M 10/6569* (2014.01)
   *H01M 2/10* (2006.01)
   *H01M 2/20* (2006.01)
   *H01M 10/04* (2006.01)

(52) U.S. Cl.
   CPC ....... *H01M 10/613* (2015.04); *H01M 10/643* (2015.04); *H01M 10/6551* (2015.04); *H01M 10/6554* (2015.04); *H01M 10/6569* (2015.04); *H01M 10/0422* (2013.01); *H01M 2220/20* (2013.01)

(58) Field of Classification Search
   CPC ........... H01M 10/643; H01M 10/6551; H01M 10/6554; H01M 10/6569; H01M 10/0422; H01M 2/206; H01M 2/1077; H01M 2/0422; H01M 2220/20
   See application file for complete search history.

(56) References Cited

U.S. PATENT DOCUMENTS

| | | |
|---|---|---|
| 2009/0142658 A1 | 6/2009 | Shen et al. |
| 2011/0293986 A1 | 12/2011 | Kozu |
| 2013/0011710 A1 | 1/2013 | Naito et al. |
| 2013/0130084 A1 | 5/2013 | Hamada et al. |
| 2014/0065455 A1* | 3/2014 | Chuang ............... H01M 2/1083 429/71 |
| 2016/0093864 A1 | 3/2016 | Nakamura et al. |
| 2017/0077567 A1 | 3/2017 | Lim et al. |
| 2019/0051955 A1* | 2/2019 | Lebreux .............. H01M 10/659 |

FOREIGN PATENT DOCUMENTS

| | | |
|---|---|---|
| JP | 10-247513 A | 9/1998 |
| JP | 2007-165032 A | 6/2007 |
| JP | 2009-515304 A | 4/2009 |
| JP | 2010-211963 A | 9/2010 |
| JP | 5108169 B1 | 12/2012 |
| JP | 2016-72039 A | 5/2016 |
| KR | 10-2002-0093827 A | 12/2002 |
| KR | 10-2011-0084959 A | 7/2011 |
| KR | 10-2014-0021830 A | 2/2014 |
| KR | 10-2014-0081949 A | 7/2014 |
| KR | 10-2016-0034675 A | 3/2016 |
| KR | 10-2016-0122444 A | 10/2016 |
| KR | 10-1679982 B1 | 11/2016 |
| WO | WO 2012/093452 A1 | 7/2012 |
| WO | WO 2016/120857 A1 | 8/2016 |
| WO | WO2016120857 * | 8/2016 |

* cited by examiner

BATTERY MODULE, BATTERY PACK INCLUDING BATTERY MODULE, AND VEHICLE INCLUDING BATTERY PACK

TECHNICAL FIELD

The present disclosure relates to a battery module, a battery pack including the battery module, and a vehicle including the battery pack.

The present application claims priority to Korean Patent Application No. 10-2017-0035398 filed on Mar. 21, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Since the battery pack of a multi-module structure is manufactured such that a plurality of secondary batteries are densely packed in a narrow space, it is important to easily release the heat generated from each secondary battery. Since secondary batteries are charged and discharged by electrochemical reaction, if the heat of the battery module generated during charging and discharging is not effectively removed, heat accumulation occurs, which may promote deterioration of the battery module and, on occasions, cause ignition or explosion.

Thus, a high-output large-capacity battery module and a battery pack equipped with it must have a cooling device for cooling the battery cells included therein.

A conventional battery module typically employs a cooling structure that contacts a thermal interface material (TIM) between the battery cells and a heatsink to release the heat.

However, in the conventional cooling structure, it is difficult to improve the performance of a battery module and a battery pack, and further the performance of an electric vehicle having the battery module or the battery pack due to low cooling performance.

DISCLOSURE

Technical Problem

The present disclosure is directed to providing a battery module capable of maximizing the cooling performance, a battery pack including the battery module, and a vehicle including the battery pack.

Technical Solution

In one aspect of the present disclosure, there is provided a battery module, comprising: a plurality of battery cells stacked on one another; a cell housing configured to accommodate the plurality of battery cells; a top plate configured to cover an entire upper side of the cell housing and electrically connected to one of positive electrodes and negative electrodes of the plurality of battery cells; and a bottom plate disposed to face the top plate and configured to cover an entire lower side of the cell housing and electrically connected to the other of the positive electrodes and the negative electrodes of the plurality of battery cells.

The battery module may further comprise a phase change material filled in the cell housing so that the plurality of battery cells are partially submerged therein and configured to guide cooling of the plurality of battery cells.

The battery module may further comprise a heatsink mounted to an upper side of the top plate to cool the plurality of battery cells.

The phase change material may be vaporized and move toward the top plate when a temperature of the plurality of battery cells is raised, and be liquefied by the heatsink and move toward the bottom plate.

A guide rib may be provided at an upper side of an inner wall of the cell housing to guide movement of the liquefied phase change material toward the bottom plate.

The battery module may further comprise at least one cell fixing member configured to fix the plurality of battery cells so as to prevent the plurality of battery cells from moving inside the cell housing.

The cell fixing member may be provided in a pair, and the pair of cell fixing members may include: an upper cell fixing member into which an upper portion of the plurality of battery cells is inserted, the upper cell fixing member being fixed to an upper side of an inner surface of the cell housing; and a lower cell fixing member into which a lower portion of the plurality of battery cells is inserted, the lower cell fixing member being fixed to a lower side of the inner surface of the cell housing.

A plurality of upper cell insert holes may be formed in the upper cell fixing member and a plurality of lower cell insert holes may be formed in the lower cell fixing member so that the plurality of battery cells are inserted therein.

A rim of the top plate may be coupled to a rim of the cell housing by seaming.

The top plate may be coupled to the one of the positive electrodes and the negative electrodes of the plurality of battery cells by welding.

The bottom plate may be coupled to the other of the positive electrodes and the negative electrodes of the plurality of battery cells by welding.

The plurality of battery cells may be cylindrical secondary batteries.

In another aspect of the present disclosure, there is also provided a battery pack, comprising: at least one battery module according to the above embodiments; and a pack case configured to package the at least one battery module.

In another aspect of the present disclosure, there is also provided a vehicle, comprising at least one battery pack according to the above embodiments.

Advantageous Effects

According to various embodiments as above, it is possible to provide a battery module capable of maximizing the cooling performance, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
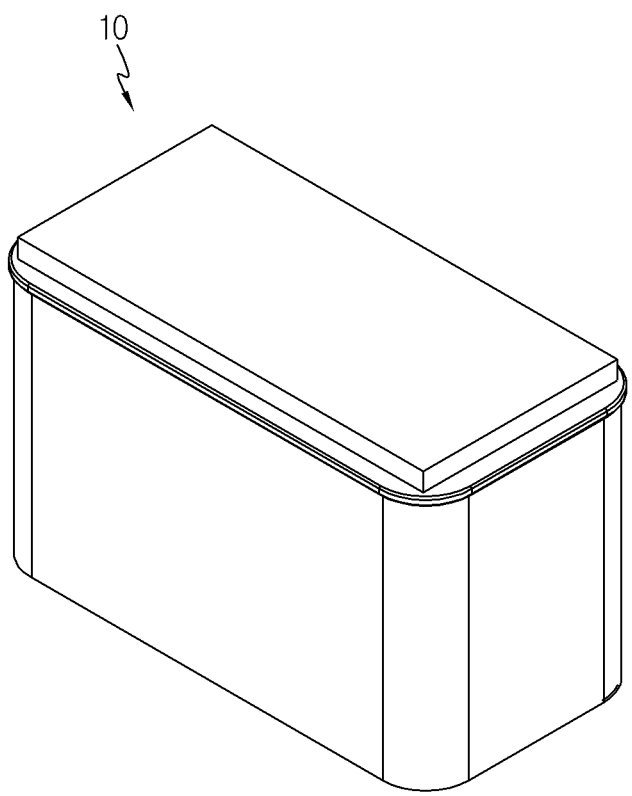
FIG. 1 is a diagram for illustrating a battery module according to an embodiment of the present disclosure.
Figure 2:
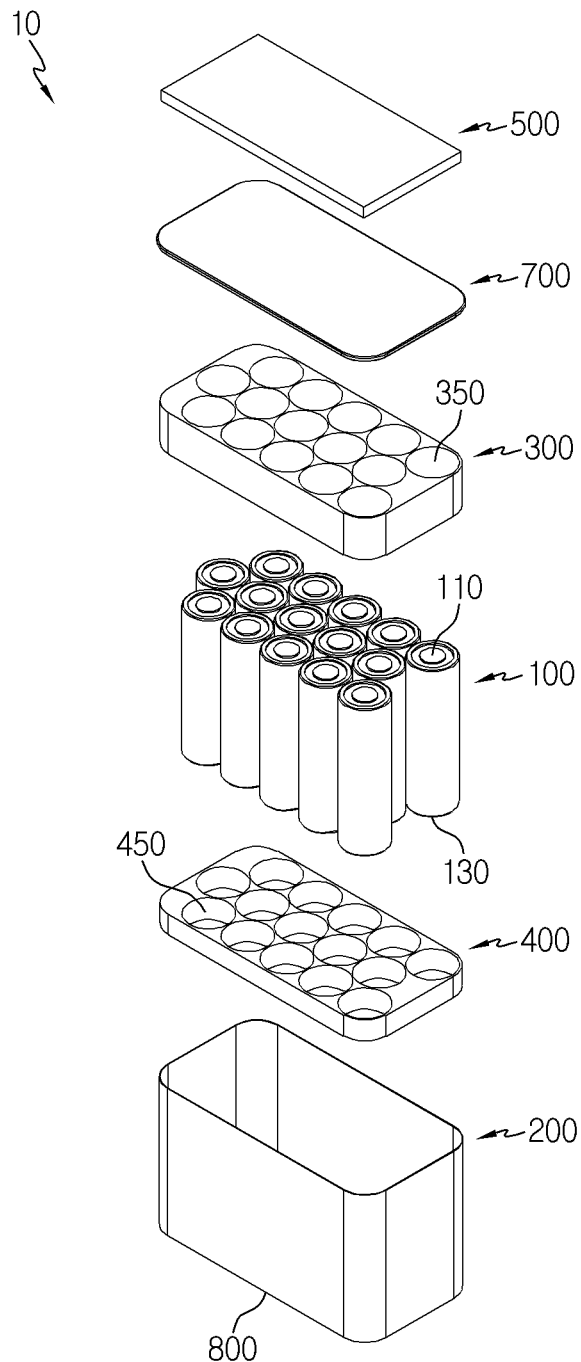
FIG. 2 is an exploded perspective view showing the battery module of FIG. 1.
Figure 3:
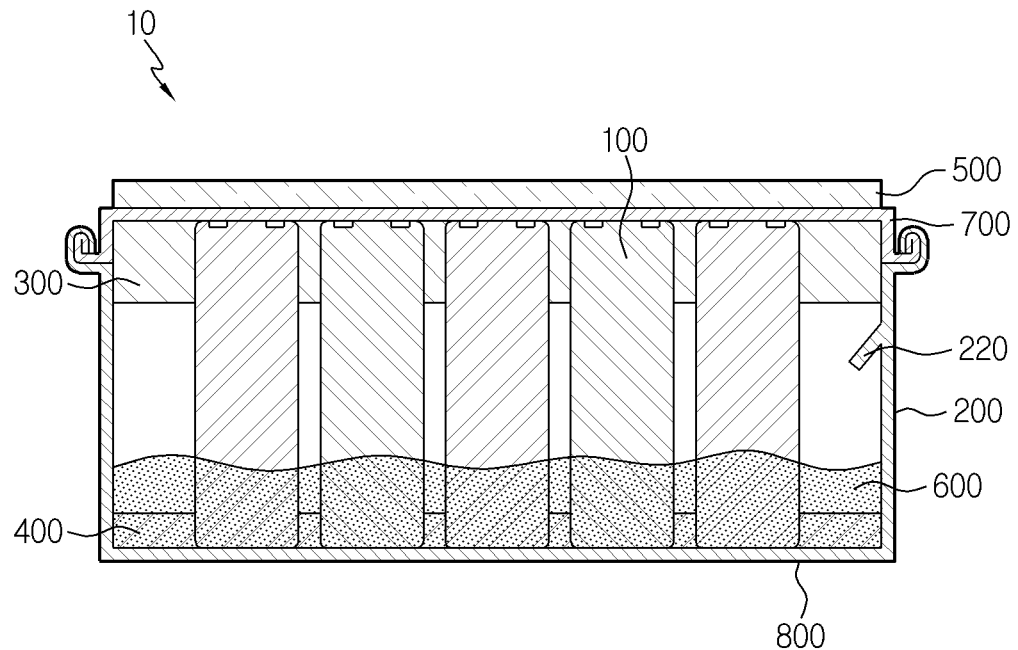
FIG. 3 is a cross-sectioned view showing the battery module of FIG. 1.
Figure 4:
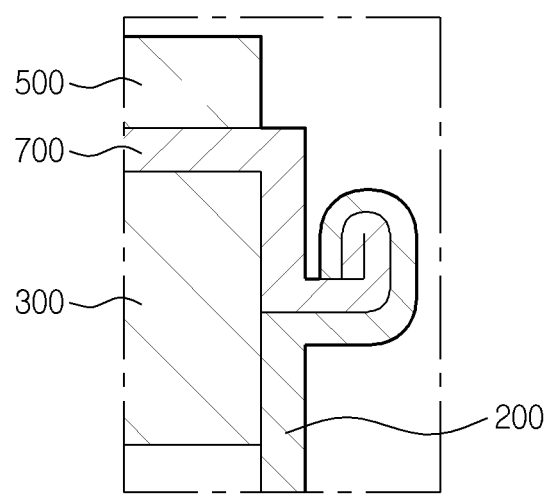
FIG. 4 is a diagram for illustrating the coupling between a top plate and a cell housing of the battery module of FIG. 1.
Figure 5:
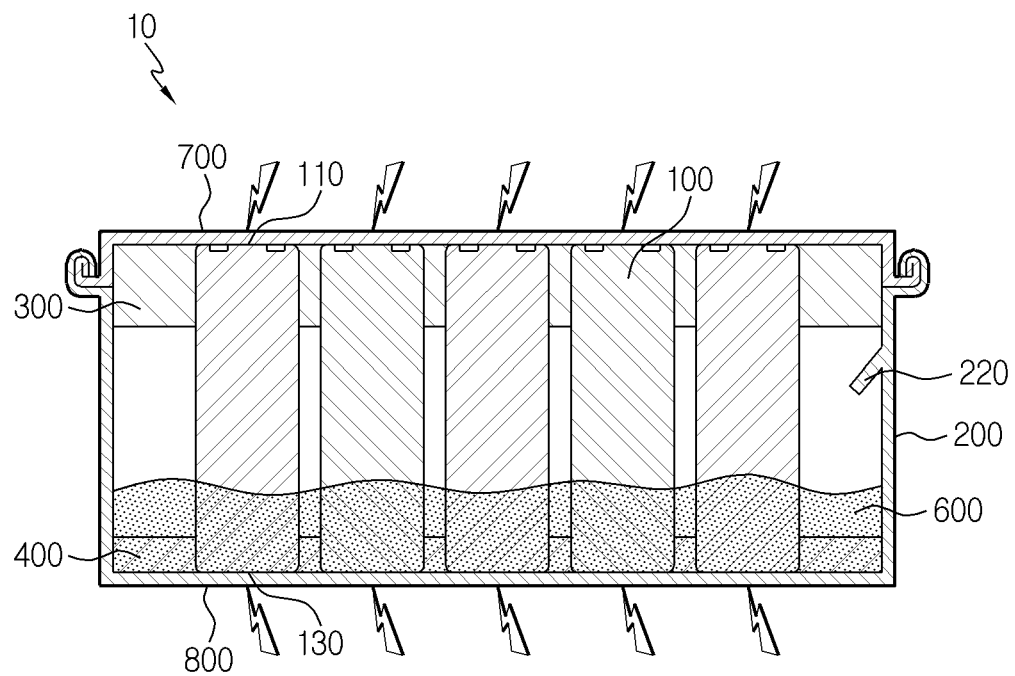
FIG. 5 is a diagram for illustrating the connection of the electrode of the battery cells of the battery module of FIG. 1.
Figure 6:
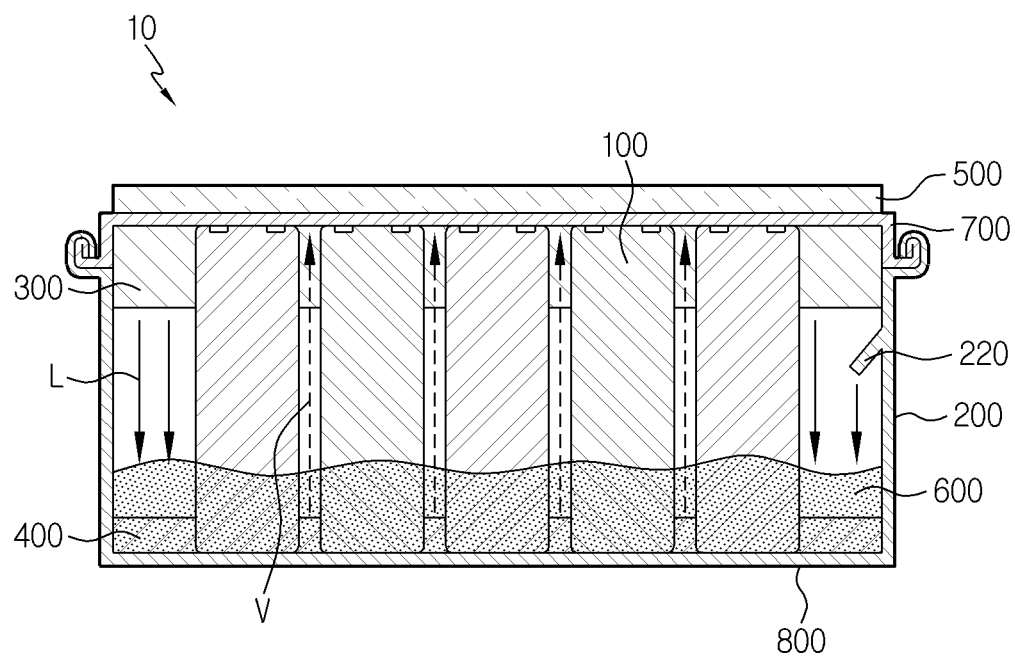
FIG. 6 is a diagram for illustrating a cooling principle of the battery module of FIG. 1.

FIG. 1 is a diagram for illustrating a battery module according to an embodiment of the present disclosure, FIG. 2 is an exploded perspective view showing the battery module of FIG. 1, FIG. 3 is a cross-sectioned view showing the battery module of FIG. 1, FIG. 4 is a diagram for illustrating the coupling between a top plate and a cell housing of the battery module of FIG. 1, FIG. 5 is a diagram for illustrating the connection of the electrode of the battery cells of the battery module of FIG. 1, and FIG. 6 is a diagram for illustrating a cooling principle of the battery module of FIG. 1.

Referring to FIGS. 1 to 6, a battery module 10 may include a battery cell 100, a cell housing 200, at least one cell fixing member 300, 400, a heatsink 500, a phase change material 600, a top plate 700 and a bottom plate 800.

The battery cell 100 may be provided in plural, and the plurality of battery cells 100 may be cylindrical secondary batteries. The plurality of battery cells 100 may be stacked on one another and electrically connected to each other.

A positive electrode 110 may be provided at a center of an upper portion of the plurality of battery cells 100, and a negative electrode 130 may be provided at an outer surface, including a rim, and a bottom surface of the plurality of battery cells 100.

The cell housing 200 may be configured to accommodate the plurality of battery cells 100. To this end, the cell housing 200 may have an accommodation space for accommodating the plurality of battery cells 100 therein.

A guide rib 220 may be provided inside the cell housing 200.

The guide rib 200 is provided at an upper side of an inner wall of the cell housing 200 and may guide the movement of the phase change material 600 to a lower side during liquefaction (L) of the phase change material 600, explained later. Specifically, the guide rib 200 may guide faster movement of the liquefied (L) phase change material 600, explained later toward the bottom plate 800, explained later.

The at least one cell fixing member 300, 400 may fix the plurality of battery cells 100 so as to prevent the plurality of battery cells 100 from moving within the cell housing 200.

The cell fixing member 300, 400 may be provided in a pair. The pair of cell fixing members 300, 400 may include an upper cell fixing member 300 and a lower cell fixing member 400.

An upper portion of the plurality of battery cells 100 is inserted into the upper cell fixing member 300, and the upper cell fixing member 300 may be fixed to an upper side of the inside of the cell housing 200. For this purpose, a plurality of cell insertion holes 350 may be formed in the upper cell fixing member 300 so that the upper portion of the plurality of battery cells 100 is inserted therein.

A lower portion of the cell housing 200 is inserted into the lower cell fixing member 400, and the lower cell fixing member 400 may be fixed to a lower side of the inside of the cell housing 200. For this purpose, a plurality of cell insertion holes 450 may be formed in the lower cell fixing member 400 so that the lower portion of the plurality of battery cells 100 is inserted therein.

The heatsink 500 is for cooling the plurality of battery cells 100 and may be mounted to an upper side of the top plate 700, explained later. The heatsink 500 may also be mounted to the cell housing 200, instead of the upper side of the top plate 700, explained later.

The phase change material 600 is configured to guide the cooling of the plurality of battery cells 100 and may be partially filled in the cell housing 200. Accordingly, the plurality of battery cells 100 may be partially submerged in the phase change material 600 inside the cell housing 200.

The phase change material 600 may be vaporized (V) and move toward the top plate 700, explained later, when a temperature of the plurality of battery cells 100 is raised, and be liquefied (L) by the heatsink 500 and move toward the bottom plate 800, explained later. The vaporization (V) and the liquefaction (L) may be repeated cyclically, through which the battery cells 100 may be cooled more effectively.

The phase change material 600 may be a fluorine-based material with a low boiling point for more effective circulation. For example, the phase change material 600 may be a material having a boiling point between 35° C. and 50° C. Moreover, the phase change material 600 may include a material having a fire extinguishing function. Accordingly, when a fire occurs in the battery module 10, the fire may be rapidly suppressed using the phase change material 600.

The top plate 700 may be coupled to the cell housing 200 to cover the entire upper side of the cell housing 200. Here, the top plate 700 may be coupled to the cell housing 200 through a seaming structure. This is to maximize the airtight structure of the cell housing 200 and to prevent the phase change material 600 in the cell housing 200 from being vaporized. The seaming structure may be made in a rim of the top plate 700 and in an upper rim of the cell housing 200. That is, the rim of the top plate 700 may be bonded to the upper rim of the cell housing 200 by seaming.

The top plate 700 may be electrically connected to one of the positive electrodes 110 and the negative electrodes 130 of the plurality of battery cells 100. Hereinafter, this embodiment will be described based on the case where the top plate 700 is electrically connected to the positive electrodes 110 of the plurality of battery cells 100.

For this purpose, the top plate 700 may be made of a metal material and coupled to the positive electrodes 110 of the plurality of battery cells 100 by welding. That is, in this embodiment, the top plate 700 serves not only as a cover for sealing the cell housing 200 but also as a bus bar for the electrical connection of the battery cells 100.

Accordingly, in this embodiment, since the top plate 700 may implement both functions as above, a separate bus bar structure for connecting the positive electrodes 110 of the battery cells 100 is not required.

Meanwhile, for insulation between the top plate 700 and the cell housing 200, the top plate 700 may be insulated at a portion coupled to the cell housing 200. In this embodiment, the top plate 700 may be insulated from the cell housing 200 at the rim portion that is bonded by seaming. If the cell housing 200 is not made of a metal material but made of a non-metallic material, the insulation treatment may be omitted.

The bottom plate 800 may be disposed to face the top plate 700 and cover an entire lower side of the cell housing 200. The bottom plate 800 may be integrally formed with the cell housing 200 or may be separately provided and mounted to the bottom of the cell housing 200.

The bottom plate 800 may be electrically connected to the other of the positive electrodes 110 and the negative electrodes 130 of the plurality of battery cells 100. In this embodiment, since the top plate 700 is electrically connected to the positive electrodes 110 of the plurality of battery cells 100, the bottom plate 800 will be described as being electrically connected to the negative electrodes 130 of the plurality of battery cells 100.

As described above, the bottom plate 800 may serve not only as a cover for sealing the bottom of the cell housing 200 but also as a bus bar for the electrical connection of the battery cells 100 along with the top plate 700.

To this end, the bottom plate 800 may be made of a metal material and coupled to the negative electrodes 130 of the plurality of battery cells 100 by welding. Meanwhile, if the bottom plate 800 is integrally formed with the cell housing 200, the cell housing 200 may also be made of a metal material. In this case, the cell housing 200 may be insulated at a portion coupled to the top plate 700 as described above for insulation with the top plate 700. If the bottom plate 800 is separately mounted to the cell housing 200, the cell housing 200 may be made of a non-metallic material, and in this case, the insulation process may be omitted.

Accordingly, in this embodiment, since the bottom plate 800 enables the sealing of the cell housing 200 and the electrical connection of the negative electrodes 130 of the battery cells 100, a separate bus bar structure for connecting the negative electrodes 130 of the battery cells 100 is not required.

As described above, in this embodiment, since the top plate 700 and the bottom plate 800 for sealing the cell housing 200 also serve as bus bars for electrically connecting the electrodes 110, 130 of the battery cells 100, a separate additional bus bar structure may be omitted, thereby reducing the manufacturing cost of the battery module 10 and improving manufacturing efficiency.

In addition, in terms of energy density, the battery module 10 according to this embodiment may ensure a further capacity of the battery cells 100 as much as the volume of the separate additional bus bar structure that is omitted.

Moreover, the battery module 10 according to this embodiment may maximize the cooling performance by means of the phase change material 600.

Figure 7:
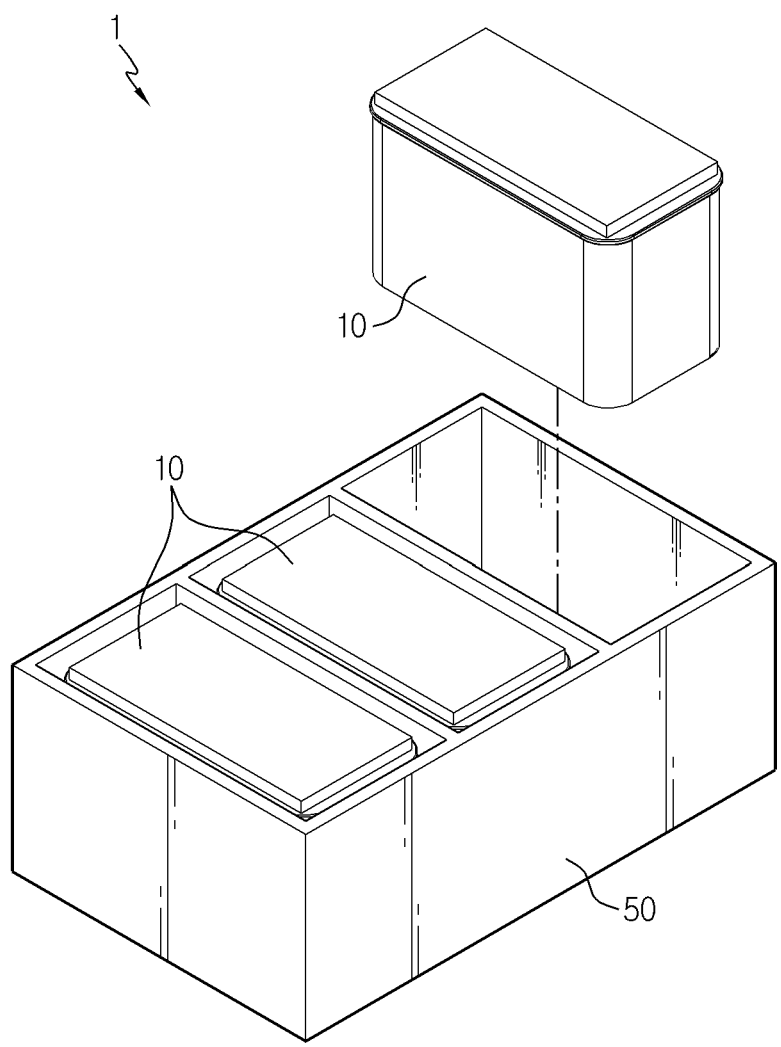
FIG. 7 is a diagram for illustrating a battery pack according to an embodiment of the present disclosure.

FIG. 7 is a diagram for illustrating a battery pack according to an embodiment of the present disclosure.

Referring to FIG. 7, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on one another;
   a cell housing configured to accommodate the plurality of battery cells;
   a top plate configured to cover an entire upper side of the cell housing and electrically connected to one of positive electrodes and negative electrodes of the plurality of battery cells;
   a bottom plate disposed to face the top plate and configured to cover an entire lower side of the cell housing and electrically connected to the other of the positive electrodes and the negative electrodes of the plurality of battery cells;
   a phase change material filled in the cell housing so that the plurality of battery cells are partially submerged therein to a certain level and configured to guide cooling of the plurality of battery cells; and
   a heatsink mounted to an upper side of the top plate to cool the plurality of battery cells, wherein the phase change material is vaporized and moves toward the top plate when a temperature of the plurality of battery cells is raised, and is liquefied by the heatsink and moves toward the bottom plate, and wherein the battery module further comprises a guide rib provided at an upper side of an inner wall of the cell housing above the certain level to guide movement of the liquefied phase change material toward the bottom plate.

2. The battery module according to claim 1, further comprising:

at least one cell fixing member configured to fix the plurality of battery cells so as to prevent the plurality of battery cells from moving inside the cell housing.

3. The battery module according to claim 2, wherein the cell fixing member is provided in a pair, and wherein the pair of cell fixing members include:

an upper cell fixing member into which an upper portion of the plurality of battery cells is inserted, the upper cell fixing member being fixed to an upper side of an inner surface of the cell housing; and a lower cell fixing member into which a lower portion of the plurality of battery cells is inserted, the lower cell fixing member being fixed to a lower side of the inner surface of the cell housing.

4. The battery module according to claim 3, wherein a plurality of upper cell insert holes are formed in the upper cell fixing member and a plurality of lower cell insert holes are formed in the lower cell fixing member so that the plurality of battery cells are inserted therein.

5. The battery module according to claim 1, wherein a rim of the top plate is coupled to a rim of the cell housing by seaming.

6. The battery module according to claim 1, wherein the top plate is coupled to the one of the positive electrodes and the negative electrodes of the plurality of battery cells by welding.

7. The battery module according to claim 1, wherein the bottom plate is coupled to the other of the positive electrodes and the negative electrodes of the plurality of battery cells by welding.

8. The battery module according to claim 1, wherein the plurality of battery cells are cylindrical secondary batteries.

9. A battery pack, comprising:

at least one battery module as defined in claim 1; and a pack case configured to package the at least one battery module.

10. A vehicle, comprising:

at least one battery pack as defined in claim 9.

11. The battery module according to claim 1, wherein the guide rib extends away from the inner wall of the cell housing towards an interior of the cell housing.

* * * * *